United States Patent
Liu et al.

(10) Patent No.: US 9,111,564 B1
(45) Date of Patent: Aug. 18, 2015

(54) MAGNETIC RECORDING WRITER HAVING A MAIN POLE WITH MULTIPLE FLARE ANGLES

(71) Applicant: Western Digital (Fremont), LLC, Fremont, CA (US)

(72) Inventors: Feng Liu, San Ramon, CA (US); Zhanjie Li, Pleasanton, CA (US); Zhigang Bai, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 11 days.

(21) Appl. No.: 13/903,124

(22) Filed: May 28, 2013

Related U.S. Application Data

(60) Provisional application No. 61/807,572, filed on Apr. 2, 2013.

(51) Int. Cl.
*G11B 5/60* (2006.01)

(52) U.S. Cl.
CPC .................................. *G11B 5/6082* (2013.01)

(58) Field of Classification Search
CPC .. G11B 5/1278; G11B 5/3116; G11B 5/3143; G11B 5/3146
USPC .......................................... 360/125.14, 125.1
See application file for complete search history.

(56) References Cited

U.S. PATENT DOCUMENTS

| | | |
|---|---|---|
| 5,801,910 A | 9/1998 | Mallary |
| 5,805,391 A | 9/1998 | Chang et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |

(Continued)

*Primary Examiner* — Angel Castro

(57) ABSTRACT

A method and system provide a magnetic transducer having an air-bearing surface (ABS). The magnetic transducer includes a main pole and at least one coil for energizing the main pole. The main pole includes a first portion and a second portion. The first portion includes a pole tip and at least one side surface. The pole tip has an ABS facing surface at the ABS. The first portion has a first flare angle between the ABS and a side surface. The second portion is on the first portion and recessed from the ABS. The second portion has a second flare angle greater than the first flare angle. The first portion is wider in a cross track direction than the second portion.

22 Claims, 6 Drawing Sheets

(56) References Cited

U.S. PATENT DOCUMENTS

| | | |
|---|---|---|
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,040 B1 | 7/2001 | Sasaki |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,327,116 B1 | 12/2001 | Watanabe et al. |
| 6,330,127 B1 | 12/2001 | Sasaki |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,497,825 B1 | 12/2002 | Kamijima |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,525,904 B1 | 2/2003 | Sasaki |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,624,971 B1 | 9/2003 | Sasaki |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |

(56) References Cited

U.S. PATENT DOCUMENTS

| | | |
|---|---|---|
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,804,088 B1 | 10/2004 | Nonaka et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,061,717 B2 | 6/2006 | Takano |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,664 B1 | 5/2008 | Mallary et al. |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |

(56) References Cited

U.S. PATENT DOCUMENTS

| | | |
|---|---|---|
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,558,019 B2 | 7/2009 | Le et al. |
| 7,583,466 B2 | 9/2009 | Kermiche et al. |
| 7,583,472 B2 * | 9/2009 | Matono ............... 360/125.1 |
| 7,593,186 B2 | 9/2009 | Bedell et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,779,534 B2 | 8/2010 | Matono |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,535 B2 | 1/2011 | Anand |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 7,990,654 B2 * | 8/2011 | Yazawa et al. .......... 360/125.09 |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,033 B2 | 2/2012 | Kameda et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,184,399 B2 | 5/2012 | Wu et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,233 B1 | 7/2012 | Shen et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,649 B2 | 10/2012 | Sasaki et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |

(56) References Cited

U.S. PATENT DOCUMENTS

| | | |
|---|---|---|
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2006/0139801 A1 | 6/2006 | Kamada |
| 2008/0239569 A1 | 10/2008 | Yazawa et al. |
| 2008/0297952 A1 | 12/2008 | Kameda et al. |
| 2008/0316644 A1 | 12/2008 | Lee et al. |
| 2009/0091861 A1 | 4/2009 | Takano et al. |
| 2009/0290257 A1 | 11/2009 | Kimura et al. |
| 2010/0149688 A1 | 6/2010 | Le et al. |
| 2010/0277832 A1* | 11/2010 | Bai et al. ............ 360/125.03 |
| 2010/0290157 A1 | 11/2010 | Zhang et al. |
| 2010/0328816 A1 | 12/2010 | Guan et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0342937 A1* | 12/2013 | Sugiyama et al. ......... 360/317 |
| 2014/0154529 A1 | 6/2014 | Yang et al. |
| 2014/0175050 A1 | 6/2014 | Zhang et al. |

\* cited by examiner

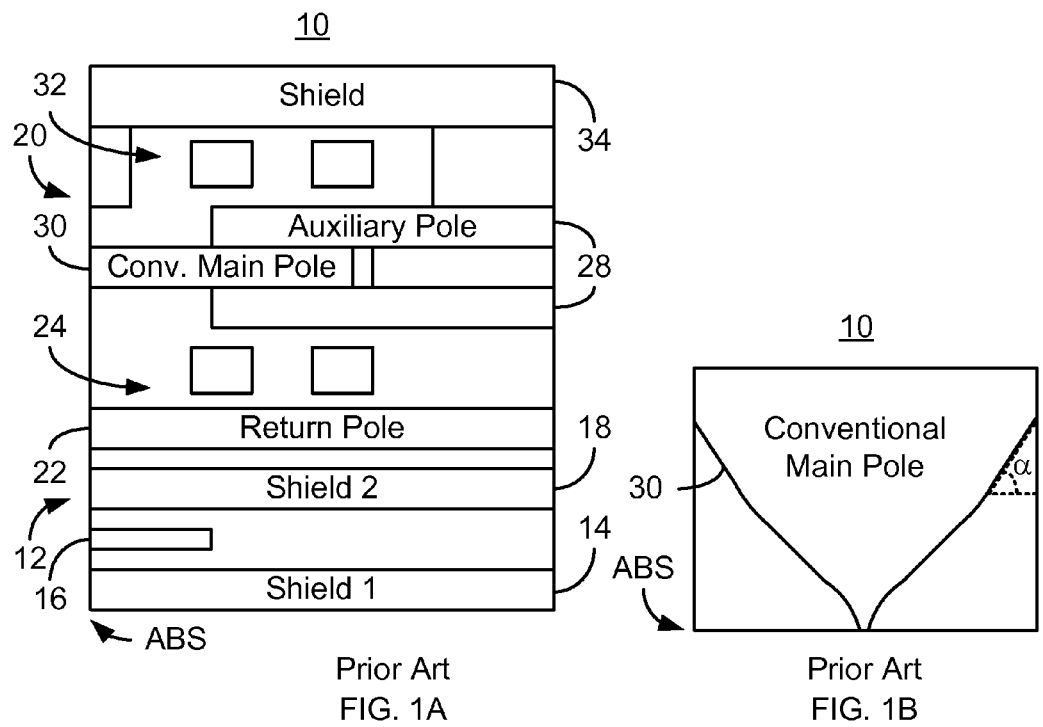
Prior Art
FIG. 1A
Prior Art
FIG. 1B
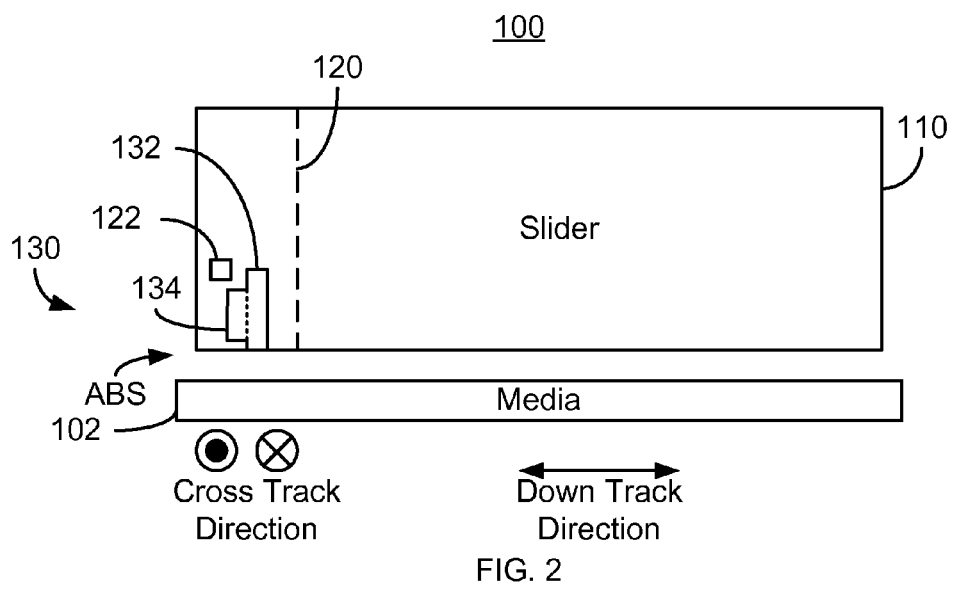
FIG. 2

MAGNETIC RECORDING WRITER HAVING A MAIN POLE WITH MULTIPLE FLARE ANGLES

CROSS-REFERENCE TO RELATED APPLICATIONS

This application claims priority to provisional U.S. Patent Application Ser. No. 61/807,572, filed on Apr. 2, 2013, which is hereby incorporated by reference in its entirety.

BACKGROUND

FIGS. 1A and 1B depict side and plan views of a conventional magnetic recording head 10. The magnetic recording head 10 may be a perpendicular magnetic recording (PMR) head. The conventional magnetic recording head 10 includes a read transducer 12 and a write transducer 20. The conventional read transducer 12 includes shields 14 and 18 and sensor 16. The read sensor 16 is typically a giant magnetoresistive (GMR) sensor or tunneling magnetoresistive (TMR) sensor. The write transducer 20 includes a first, or return, pole 22, coils 24 and 32, back gap 26, auxiliary poles 28, main pole 30 and shield 344. As can be seen in the plan view, the write pole 30 pole has a flare angle, a. The flare angle is typically on the order of forty-five degrees or less. Although not shown, the main pole 30 may have leading and/or trailing edge bevels. In such cases, the main pole 30 is shortest in the down track direction at the ABS.

Although the conventional magnetic recording head 10 functions, there are drawbacks. In particular, the conventional magnetic recording head 10 may not perform sufficiently at higher recording densities. For example, the write field provided by the main pole 30 and the reverse overwrite may not meet desired standards. Accordingly, what is needed is a system and method for improving the performance of a magnetic recording head.

BRIEF DESCRIPTION OF SEVERAL VIEWS OF THE DRAWINGS

FIGS. 1A-1B depict side and ABS views of a conventional magnetic recording head.

FIG. 2 depicts an exemplary embodiment of a magnetic recording disk drive.

DETAILED DESCRIPTION OF THE PREFERRED EMBODIMENTS

Figure 3A:
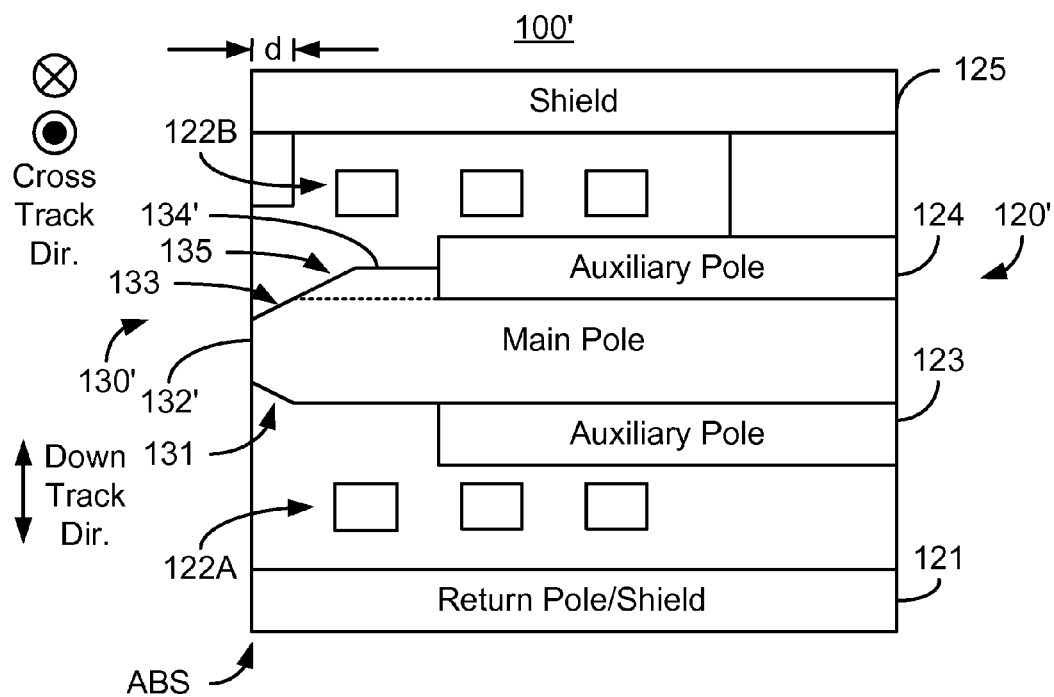
FIGS. 3A and 3B depict side and plan views of an exemplary embodiment of a magnetic recording transducer.

FIG. 2 depicts a side view of an exemplary embodiment of a portion of a disk drive 100. For clarity, FIG. 2 is not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components 102, 110, 120 and 130 are shown. However, multiples of each components 102, 110, 120 and/or and their sub-components, might be used. The disk drive 100 may be a PMR disk drive. However, in other embodiments, the disk drive 100 may be configured for other types of magnetic recording.

The disk drive 100 includes media 102, a slider 110 and a HAMR transducer 120. Additional and/or different components may be included in the disk drive 100. Although not shown, the slider 110 and thus the transducer 120 are generally attached to a suspension (not shown).

The transducer 120 is fabricated on the slider 110 and includes an air-bearing surface (ABS) proximate to the media 102 during use. In general, the disk drive 100 includes a write transducer 120 and a read transducer (not shown). However, for clarity, only the write transducer 120 is shown. The transducer 120 includes coil(s) 122 and a main pole 130. In other embodiments, different and/or additional components may be used in the write transducer 120.

As can be seen in FIG. 2, the main pole 130 includes two portions 132 and 134. These portions 132 and 134 are separated by a dotted line because the main pole 130 includes both 132 and 134. The portions 132 and 134 of the main pole are ferromagnetic and may have a high saturation magnetization. For example, the portions 132 and 134 of the main pole may include one or more of CoFe, CoNiFe and NiFe. In other embodiments different and/or additional materials may be used. Further, the portions 132 and 134 may be made of the same or different materials. The portion 132 has a pole tip a portion of which occupies the ABS. The portion 134 is recessed from the ABS. The second portion 134 may be recessed by at least one hundred and not more than three hundred nanometers from the ABS. In some embodiments, the second portion 134 may be recessed on the order of two hundred twenty through two hundred fifty nanometers from the ABS. Although not depicted in FIG. 2, the portions 132 and 134 also have different flare angles. The first portion 132 may be considered to have a first flare angle and a first width in the cross track direction. The second portion 134 has a second flare angle and a second width in the cross track direction. In particular, the second flare angle of the portion 134 is greater than the first flare angle of the portion 132. In some embodiments, the second flare angle is at least seventy degrees. In some such embodiments, the second flare angle is at least seventy-four degrees. In addition, the first portion 132 is wider in the cross track direction than the second portion. Stated differently, the first portion 132 has a maximum width that is greater than that of the second portion. However, in some locations, the widths may be the same. In some embodiments, the maximum width of the second portion 134 is not more than half the maximum width of the first portion 132. Further, although shown as having substantially the same thickness in the down track direction, the second portion 134 may be thinner than the first portion 132. For example, the second portion may be at least fifty and not more than one hundred nanometers thick in the down track direction.

The magnetic disk drive 100 may exhibit improved performance. The main pole 130 having portions 132 and 134 may have a higher write field than a conventional main pole. In addition, the gradient in the write field may be enhanced. Further, the second portion 134 has a smaller width and larger flare angle than the portion 132. As a result, the flux from the main pole 130 may be less likely to leak to any side shields (not shown in FIG. 2). Thus, the increase in write field may be achieved without degrading off track (e.g. wide area track erasure (WATER)) performance. If the disk drive 100 is a PMR disk drive, the on track write field may be enhanced and reverse overwrite (ReOVW) performance improved without sacrificing WATER performance. Further, the main pole 130 may be relatively easily fabricated. If the portions 132 and 134 are made of the same material, a trench deep enough to accommodate the entire pole 130 may be formed and excess material removed so that the second portion 134 has the desired shape. For example, an ion mill may be performed to remove excess magnetic material. In other embodiments, the pole 130 may be fabricated in another manner. Further, the pole 130 may be compatible with different platforms for the disk drive 100. Thus, performance of the disk drive 100 may be improved.

Figure 3B:
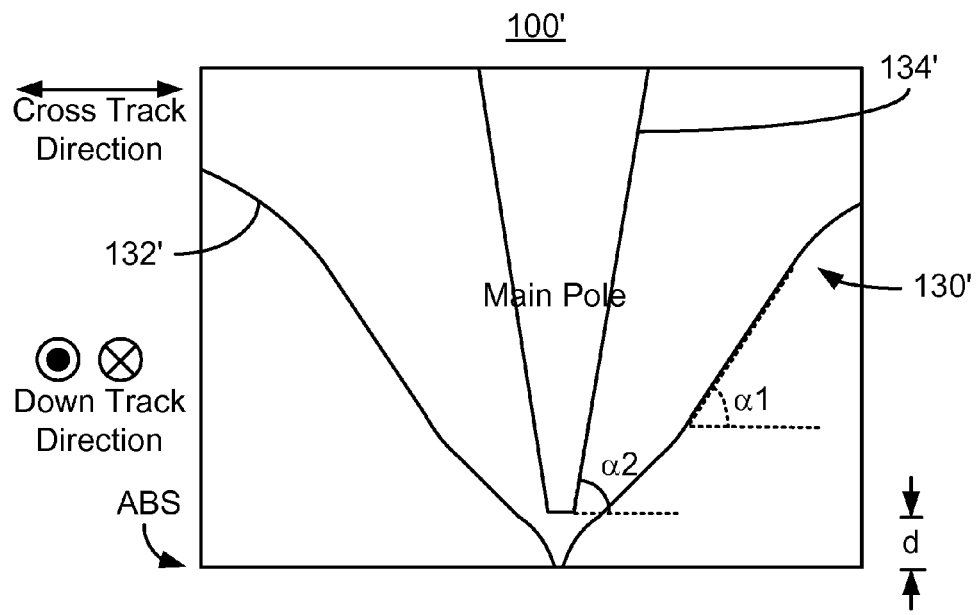

FIGS. 3A and 3B depict side and plan views, respectively, of an exemplary embodiment of a magnetic disk drive 100'. For simplicity, only a portion of the magnetic recording transducer 120' is shown. For clarity, FIGS. 3A and 3B are not to scale. The magnetic recording disk drive 100' is analogous to the magnetic disk drive 100. Consequently, analogous components have similar labels. The magnetic recording disk drive 100' thus includes the write transducer 120'.

The write transducer 120' includes a main pole 130', coil(s) 122A and 122B, optional return pole/shield 121, optional shield 125 and optional auxiliary poles 123 and 124. In some embodiments, one or more of the auxiliary poles 123 and 124 may be omitted. The auxiliary pole(s) 123 and 124 are ferromagnetic. The coils 122A and 122B correspond to the coil 122 of FIG. 2. Referring back to FIGS. 3A and 3B, the coils 122A and 122B may be separate pancake coils or may form a single helical coil.

The pole 130' includes first portion 132' and second portion 134'. These portions 132' and 134' are shown as separated by a dotted line because the main pole 130' includes both 132' and 134'. The portions 132' and 134' of the main pole 130' are analogous to the portions 132 and 134 of the main pole 130, respectively. Thus, the portions 132' and 134' are ferromagnetic and may have a high saturation magnetization. For example, the portions 132' and 134' of the main pole may include one or more of CoFe, CoNiFe and NiFe. Further, the portions 132' and 134' may be made of the same or different materials.

The portion 132' has a pole tip a portion of which occupies the ABS. The pole tip may also include at least part of the bevel 133. The sidewalls of the first portion 132' form a first flare angle, α1, with the ABS. The first portion also has a first width in the cross track direction. The first flare angle may be less than fifty degrees. In some embodiments, the first flare angle is not more than forty five degrees. The first portion 132' of the main pole 130' also includes bevels 131 and 135. In some embodiments, one or both of the bevels 131 and 135 may be omitted.

The second portion 134' of the main pole 130' is recessed from the ABS by a distance d. In some embodiments, d is at least one hundred and not more than three hundred nanometers. The second portion 134' has sidewalls that form a second flare angle, α2, with the ABS. The second portion 134' also has a second width in the cross track direction. The second flare angle of the portion 134' is greater than the first flare angle of the portion 132'. In some embodiments, the second flare angle is at least seventy degrees. In some such embodiments, the second flare angle is at least seventy-four degrees. In the embodiment shown, the second portion 134 extends from the distance d from the ABS to the auxiliary pole 124. However, in other embodiments, a space may exist between the second portion 134 of the main pole 130' and the auxiliary pole 124.

The widths of the portions 132' and 134' in the cross track direction generally differ at least in part because of the difference in the flare angles α1 and α2. In the embodiment shown, the width of the portion 132' is greater than or equal to the width of the second portion 134' at a distance d from the ABS. In the embodiment shown, the width of the second portion 134' is not more than half of the width of the first portion 132' at the distance d from the ABS. Because of the difference in flare angles, at other distances from the ABS, the first portion 132' is even wider in the cross track direction than the second portion 134'. Further, the thickness in the down track direction of the second portion 134' may be less than that of the first portion 132'. For example, the second portion 134' may be at least fifty and not more than one hundred nanometers thick in the down track direction. However, in other embodiments, other widths and/or thicknesses may be used.

The second portion 134' of the main pole 132' includes bevel 135. In the embodiment shown, the bevel 135 of the second portion 134' matches the bevel 133 of the first portion 132'. Stated differently, the bevels 133 and 135 are both at the same angle from the ABS. Thus, the bevels 133 and 135 form a single beveled surface for the main pole 130'. Further, in some embodiments the widths of the portions 132' and 134' match at the ABS facing surface. This means that at least at the bottom of the beveled surface 135 and the top of the beveled surface 133, the widths of the portions 132' and 134' are the same. However, in other embodiments, the width of the first portion 132' may be greater than that of the second portion 134' at all distances from the ABS. In such embodiments, the bevels 133 and 135 form a single, smooth beveled surface for the main pole 130'. Further, in the embodiment shown, the second portion 134' extends to the ABS facing surface of the auxiliary pole 124. In other embodiments, there may be a space between the second portion 134' and the auxiliary pole 124.

The magnetic disk drive 100' may share the benefit(s) of the magnetic disk drive 100. The main pole 130' having portions 132' and 134' may have a higher write field and higher write field gradient than a conventional main pole. Further, the second portion 134' has a smaller width and larger flare angle than the first portion 132'. As a result, the flux from the main pole 130' may be increased while substantially maintaining off track performance. Further, the main pole 130' may be relatively easily fabricated. Further, the pole 130' may be compatible with different platforms for the disk drive 100'. Thus, performance of the disk drive 100' may be improved.

Figure 4A:
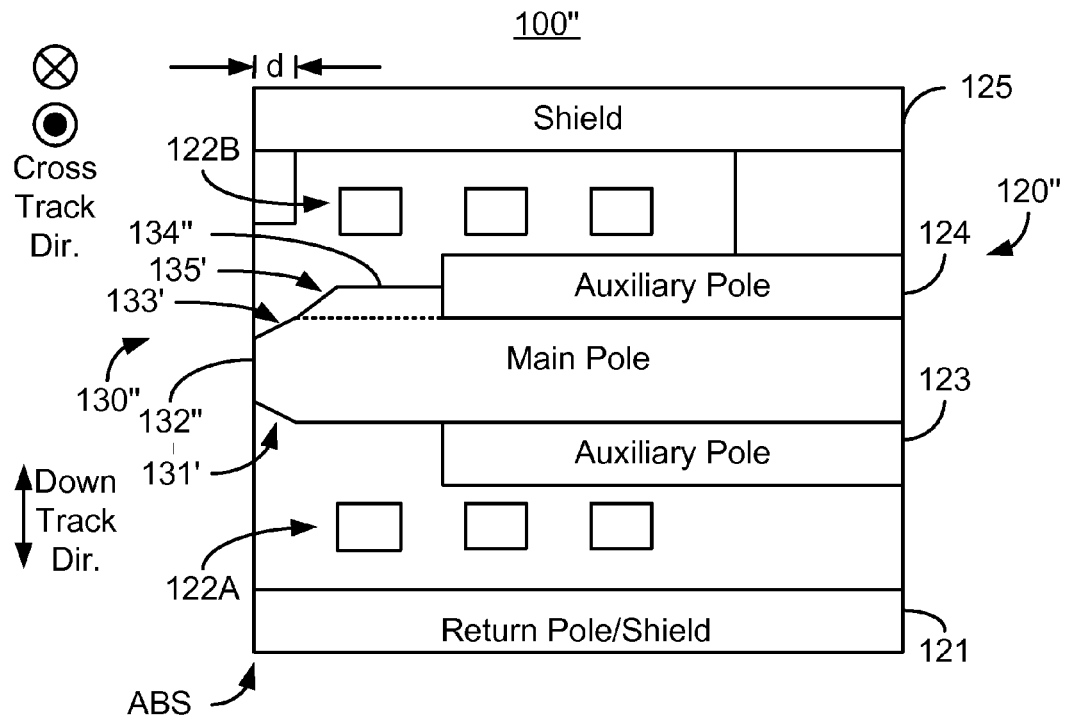
FIGS. 4A and 4B depict side and plan views of an exemplary embodiment of a magnetic recording transducer.
Figure 4B:
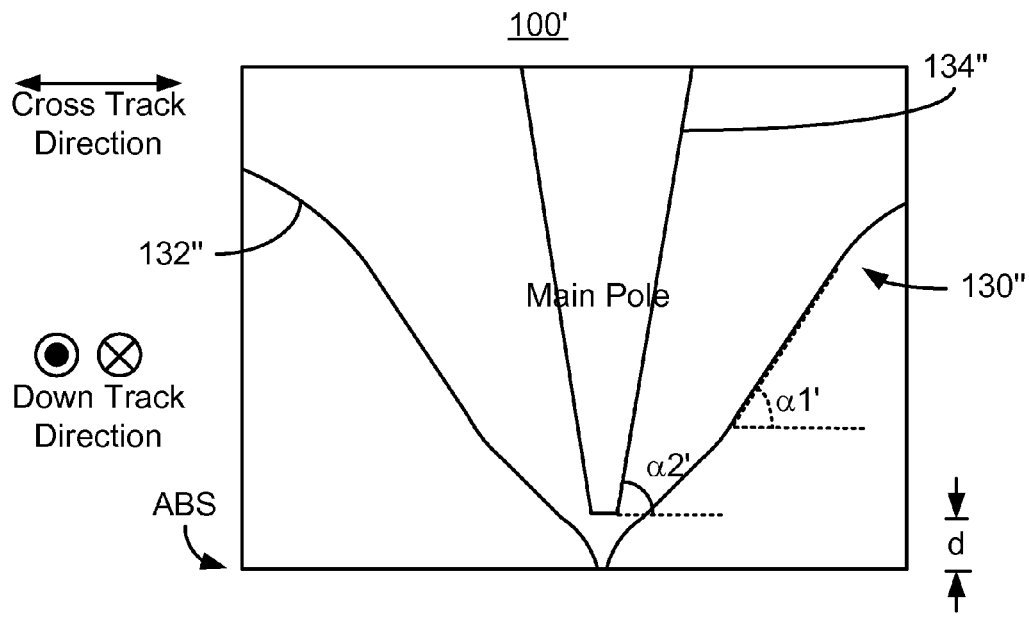

FIGS. 4A and 4B depict side and plan views, respectively, of an exemplary embodiment of a magnetic disk drive 100". For simplicity, only a portion of the magnetic recording transducer 120" is shown. For clarity, FIGS. 4A and 4B are not to scale. The magnetic recording disk drive 100" is analogous to the magnetic disk drives 100 and 100'. Consequently, analogous components have similar labels. The magnetic recording disk drive 100" thus includes the write transducer 120" having a main pole 130", coil(s) 122A and 122B, optional return pole/shield 121, optional shield 125 and optional auxiliary poles 123 and 124 that are analogous to the main pole 130', coil(s) 122A and 122B, optional return pole/shield 121, optional shield 125 and optional auxiliary poles 123 and 124. Thus, the structure and function of the pole 130/130', coil(s) 122A and 122B, optional return pole/shield 121, optional shield 125 and optional auxiliary poles 123 and 124 are analogous to that of the main pole 130', coil(s) 122A and 122B, optional return pole/shield 121, optional shield 125 and optional auxiliary poles 123 and 124.

The pole 130" includes first portion 132" and second portion 134" analogous to portions 132/132' and 134/134', respectively. Thus, the structure, function and material(s) used for the portions 132" and 134" may be analogous to those of portions 132/132' and 134/134', respectively. For example, the flare angle α1' of the portion 132" and the flare angle α2' of the portion 134" are analogous to the flare angles α1 and α2. Consequently, α2' is greater than α1' and may be at least seventy four degrees. Further, the width of the second portion 134" in the cross track direction is less than or equal to that of the first portion 132". The second portion 134" is also thin in the down track direction. For example, the second portion 134" may be at least fifty nanometers and not more than one hundred nanometers thick.

The second portion 134" of the main pole 130" includes bevel 135', while the first portion 132" of the main pole 130" includes bevel 133'. In the embodiment shown, the bevel 135' of the second portion 134' has a different angle than the bevel 133' of the first portion 132". Further, in some embodiments the widths of the portions 132" and 134" match at the ABS facing surface. This means that at least at the bottom of the beveled surface 135' and the top of the beveled surface 133', the widths of the portions 132" and 134" are the same. However, in other embodiments, these widths may differ. Finally, the second portion 132" starts at the top of the bevel 133'. As a result, the bevels 133' and 135' form a single surface having an angle where the surfaces 133' and 135' meet. Further, in the embodiment shown, the second portion 134" extends to the ABS facing surface of the auxiliary pole 124. In other embodiments, there may be a space between the second portion 134" and the auxiliary pole 124.

The magnetic disk drive 100" may share the benefit(s) of the magnetic disk drives 100 and/or 100'. The main pole 130" having portions 132" and 134" may have a higher write field and higher write field gradient than a conventional main pole. Further, the second portion 134' has a smaller width and larger flare angle than the portion 132'. As a result, the flux from the main pole 130" may be increased while substantially maintaining off track performance. Further, the main pole 130" may be relatively easily fabricated. Further, the pole 130" may be compatible with different platforms for the disk drive 100". Thus, performance of the disk drive 100" may be improved.

Figure 5A:
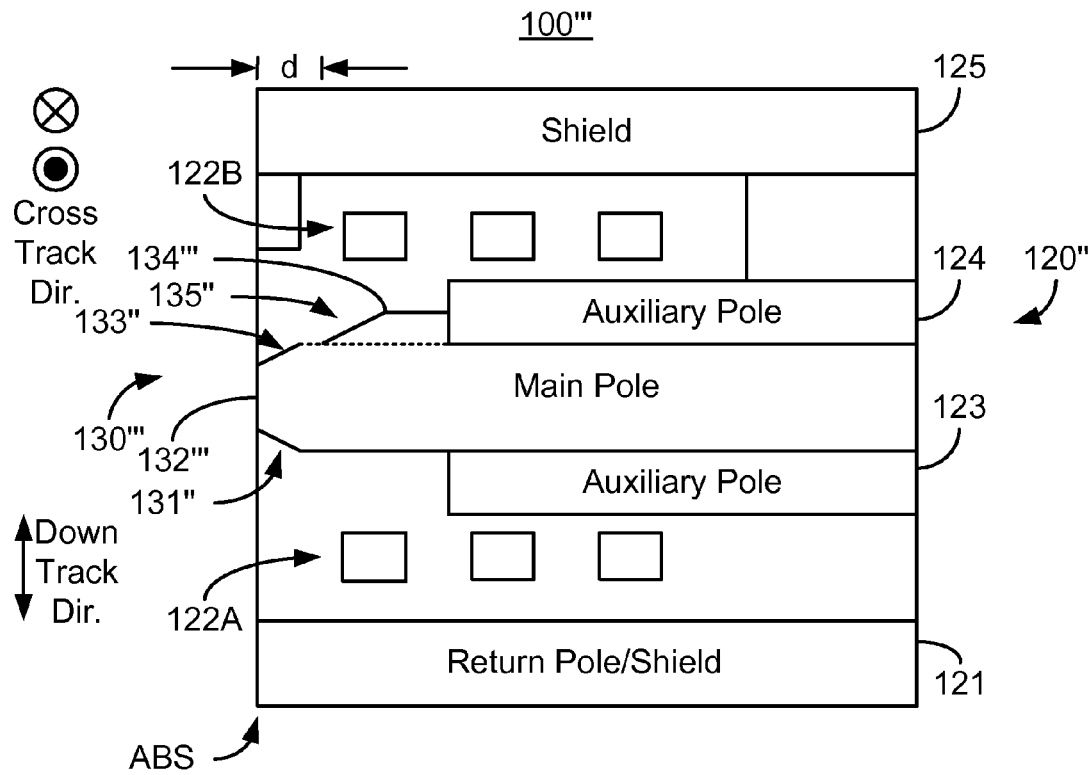
FIGS. 5A and 5B depict side and plan views of an exemplary embodiment of a magnetic recording transducer.
Figure 5B:
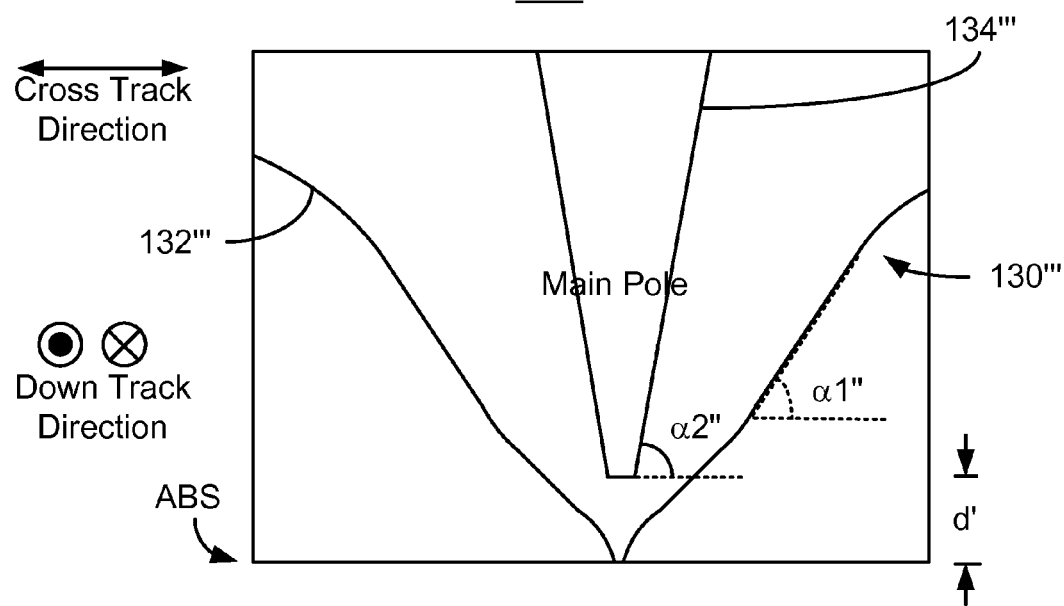

FIGS. 5A and 5B depict side and plan views, respectively, of an exemplary embodiment of a magnetic disk drive 100'". For simplicity, only a portion of the magnetic recording transducer 120'" is shown. For clarity, FIGS. 5A and 5B are not to scale. The magnetic recording disk drive 100'" is analogous to the magnetic disk drives 100, 100' and 100". Consequently, analogous components have similar labels. The magnetic recording disk drive 100'" thus includes the write transducer 120'" having a main pole 130'", coil(s) 122A and 122B, optional return pole/shield 121, optional shield 125 and optional auxiliary poles 123 and 124 that are analogous to the main pole 130, 130' and 130", coil(s) 122A and 122B, optional return pole/shield 121, optional shield 125 and optional auxiliary poles 123 and 124. Thus, the structure and function of the pole 130'", coil(s) 122A and 122B, optional return pole/shield 121, optional shield 125 and optional auxiliary poles 123 and 124 are analogous to that of the main pole 130/130'/130", coil(s) 122A and 122B, optional return pole/shield 121, optional shield 125 and optional auxiliary poles 123 and 124.

The pole 130'" includes first portion 132'" and second portion 134'" analogous to portions 132/132'/132" and 134/134'/134", respectively. Thus, the structure, function and material(s) used for the portions 132'" and 134'" may be analogous to those of portions 132/132'/132" and 134/134'/134", respectively. For example, the flare angle α1" of the portion 132'" and the flare angle α2" of the portion 134'" are analogous to the flare angles α1/α1' and α2/α2'. Consequently, α2" is greater than α1" and may be at least seventy four degrees. Further, the width of the second portion 134'" in the cross track direction is less than or equal to that of the first portion 132'". In some embodiments, the width of the second portions 134'" is not more than half the width of the first portion 132'". The second portion 134'" is also thin in the down track direction. For example, the second portion 134'" may be at least fifty nanometers and not more than one hundred nanometers thick.

The second portion 134'" of the main pole 130'" includes bevel 135", while the first portion 132'" of the main pole 130'" includes bevel 133". In the embodiment shown, angle of the bevel 135" of the second portion 134'" matches the bevel 133" of the first portion 132'". In other embodiments, the angles of the bevels 133" and 135" may differ. In some embodiments the widths of the portions 132" and 134" match at the ABS facing surface. This means that at least at the bottom of the beveled surface 135" and the top of the beveled surface 133", the widths of the portions 132'" and 134'" may be the same. In other embodiments, these widths may differ. However, in the embodiment shown, the distance, d, that the second portion 134'" is recessed is greater than the amount that the top edge of the bevel 133" is recessed. Consequently, there is a space between the bevel 133" and the bevel 135". Further, in the embodiment shown, the second portion 134'" extends to the ABS facing surface of the auxiliary pole 124. In other embodiments, there may be a space between the second portion 134'" and the auxiliary pole 124.

The magnetic disk drive 100'" may share the benefit(s) of the magnetic disk drives 100, 100', and/or 100". The main pole 130'" having portions 132'" and 134'" may have a higher write field and larger write field gradient than a conventional main pole. Further, the second portion 134'" has a smaller width and larger flare angle than the portion 132'". As a result, the flux from the main pole 130'" may be increased while substantially maintaining off track performance. Further, the main pole 130'" may be relatively easily fabricated. Further, the pole 130'" may be compatible with different platforms for the disk drive 100'". Thus, performance of the disk drive 100'" may be improved.

Figure 6A:
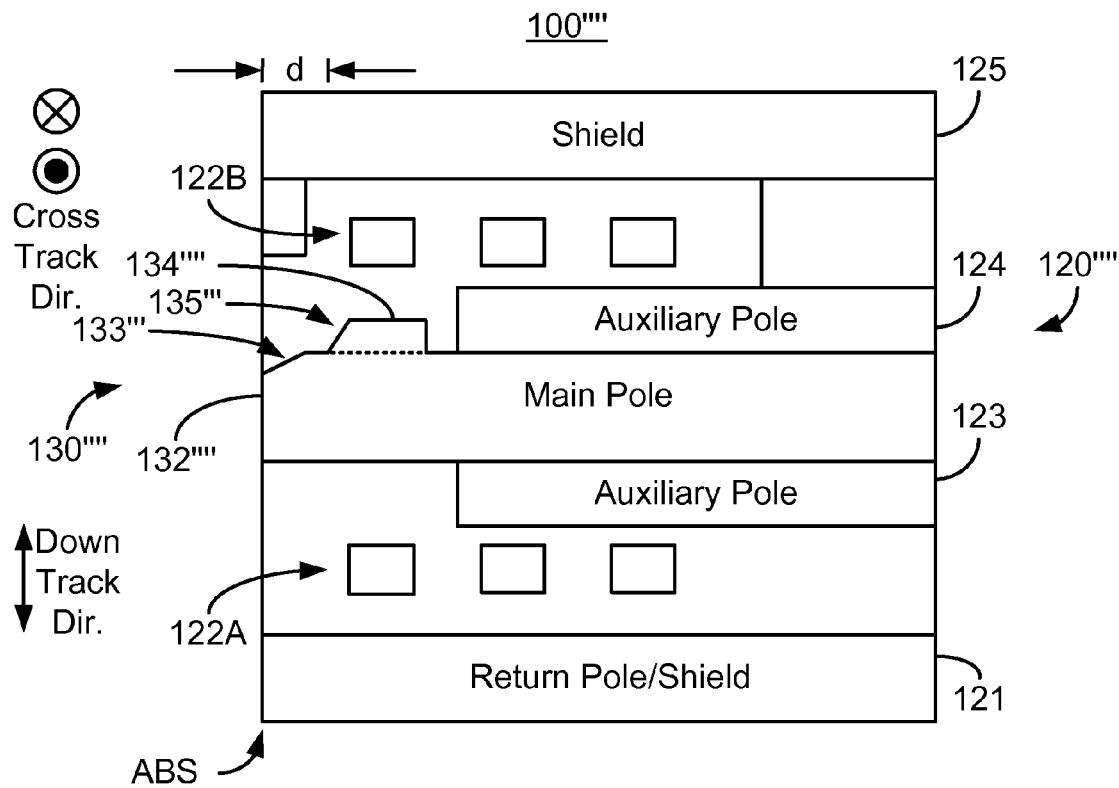
FIGS. 6A and 6B depict side and plan views of an exemplary embodiment of a magnetic recording transducer.
Figure 6B:
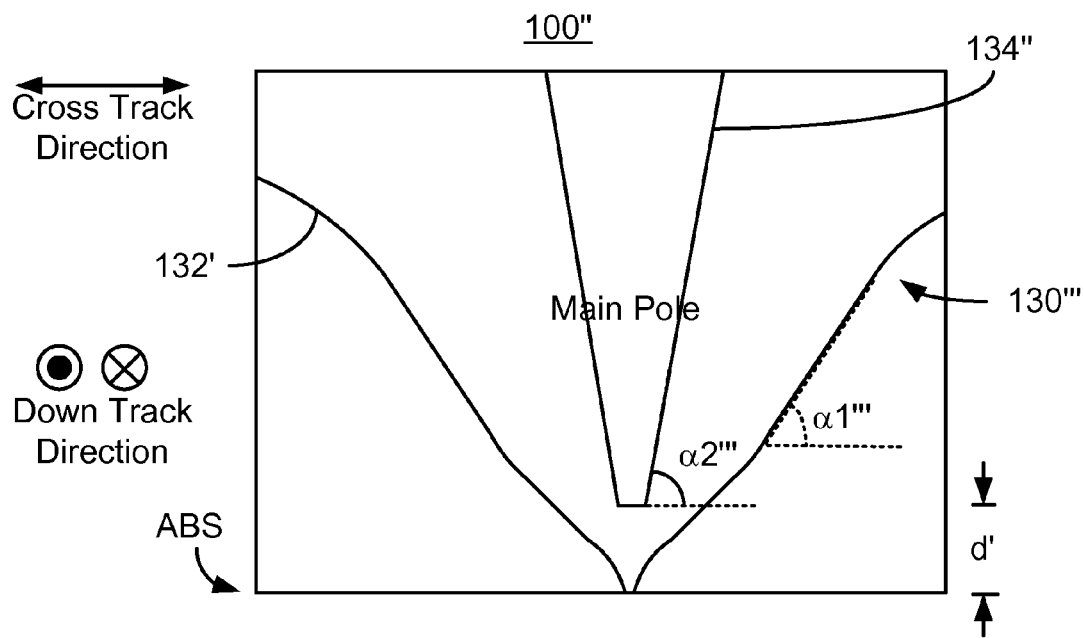

FIGS. 6A and 6B depict side and plan views, respectively, of an exemplary embodiment of a magnetic disk drive 100"". For simplicity, only a portion of the magnetic recording transducer 120"" is shown. For clarity, FIGS. 6A and 6B are not to scale. The magnetic recording disk drive 100"" is analogous to the magnetic disk drives 100, 100', 100" and 100'". Consequently, analogous components have similar labels. The magnetic recording disk drive 100"" thus includes the write transducer 120"" having a main pole 130"", coil(s) 122A and 122B, optional return pole/shield 121, optional shield 125 and optional auxiliary poles 123 and 124 that are analogous to the main pole 130, 130', 130" and 130'", coil(s) 122A and 122B, optional return pole/shield 121, optional shield 125 and optional auxiliary poles 123 and 124. Thus, the structure and function of the pole 130"", coil(s) 122A and 122B, optional return pole/shield 121, optional shield 125 and optional auxiliary poles 123 and 124 are analogous to that of the main pole 130/130'/130", coil(s) 122A and 122B, optional return pole/shield 121, optional shield 125 and optional auxiliary poles 123 and 124.

The pole 130"" includes first portion 132"" and second portion 134"" analogous to portions 132/132'/132"/132'" and 134/134'/134"/134'", respectively. Thus, the structure, function and material(s) used for the portions 132"" and 134"" may be analogous to those of portions 132/132'/132"/132'" and 134/134'/134"/134'", respectively. For example, the flare angle α1'" of the portion 132"" and the flare angle α2'" of the portion 134"" are analogous to the flare angles α1/α1'/α1"

and α2/α2'/α2". Consequently, α2'" is greater than α1'" and may be at least seventy four degrees. Further, the width of the second portion 134'" in the cross track direction is less than or equal to that of the first portion 132"". In some embodiments, the width of the second portion 134'" is not more than half that of the first portion 132'". The second portion 134"" is also thin in the down track direction. For example, the second portion 134"" may be at least fifty nanometers and not more than one hundred nanometers thick.

The second portion 134"" of the main pole 130"" includes bevel 135'", while the first portion 132"" of the main pole 130"" includes bevel 133'". In the embodiment shown, angle of the bevel 135'" of the second portion 134"" forms a different angle with the ABS than the bevel 133'" of the first portion 132". In other embodiments, the angles of the bevels 133" and 135" may have the same angle with the ABS. In the embodiment shown, the second portion 132"" is recessed further from the ABS than the top edge of the bevel 133'". However, in other embodiments, the bottom edge of the bevel 135'" may be at the same location as the top edge of the bevel 133'". Further, in the embodiment shown, the second portion 134"" does not extend to the ABS facing surface of the auxiliary pole 124. Thus, there is a space between the second portion 134"" and the auxiliary pole 124. In other embodiments, the second portion 134"" may adjoin the auxiliary pole 124. In some embodiments the widths of the portions 132"" and 134"" match at the ABS facing surface. This means that at least at the bottom of the beveled surface 135'" and the top of the beveled surface 133'", the widths of the portions 132"" and 134"" may differ. However, in the embodiment shown, the distance, d, that the second portion 134"" is recessed is greater than the amount that the top edge of the bevel 133"" is recessed.

The magnetic disk drive 100"" may share the benefit(s) of the magnetic disk drives 100, 100', 100" and/or 100'". The main pole 130"" having portions 132"" and 134"" may have a higher write field and larger write field gradient than a conventional main pole. Further, the second portion 134"" has a smaller width and larger flare angle than the portion 132"". As a result, the flux from the main pole 130"" may be enhanced while substantially maintaining off track performance. Further, the main pole 130"" may be relatively easily fabricated. Further, the pole 130"" may be compatible with different platforms for the disk drive 100"". Thus, performance of the disk drive 100"" may be improved. Further although various features are described in FIGS. 2, 3A-3B, 4A-4B, 4A-5B and 6A-6B, one or more of the features may be combined in manners not shown.

Figure 7:
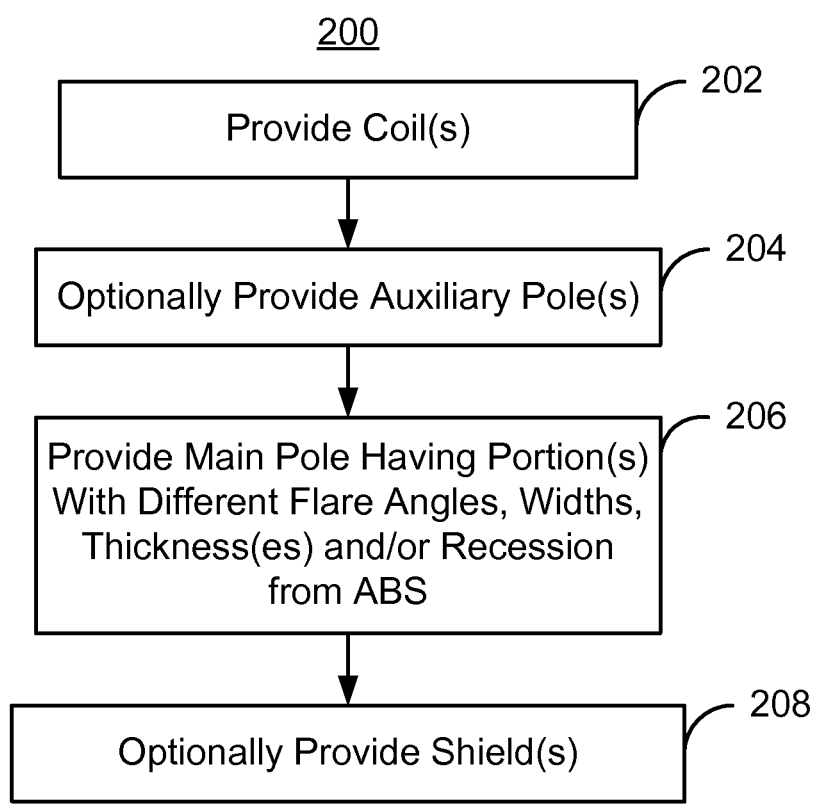
FIG. 7 is flow chart depicting an exemplary embodiment of a method for fabricating a magnetic recording head.

FIG. 7 depicts an exemplary embodiment of a method 200 for providing a magnetic recording head having a main pole with two parts. For simplicity, some steps may be omitted, interleaved, and/or combined. The method 200 is also described in the context of providing a magnetic recording head 100' depicted in FIGS. 3A-3B. However, the method 200 may be used to fabricate multiple magnetic recording heads at substantially the same time. The method 200 may also be used to fabricate other magnetic recording heads including but not limited to any combination of 100, 100", 100'", and/or 100"". The method 200 is also described in the context of particular layers. A particular layer may include multiple materials and/or multiple sub-layers. The method 200 also may start after formation of other portions of the magnetic recording head. For example, the method 200 may start after a read transducer, return pole/shield and/or other structure have been fabricated.

Referring to FIGS. 3A, 3B and 7, the coil(s) 122A and/or 122B are provided, via step 202. Portions of step 202 may thus be interleaved with the remaining steps of the method 200. For example, the coil 122A may be provided before the formation of the auxiliary poles 123 and 124 and the main pole 130'. However, the coil 122B may be provided after these structures 123, 124 and 130' have been formed. Step 202 may also include depositing and patterning the material(s) used for the coil(s) 122A and/or 122B. Step 202 may include forming a single helical coil formed of the coils 122A and 122B. Alternatively, one or two pancake coils may be formed using coils 122A and/or 122B. In such embodiments, a pancake coil 122A and/or 122B may include other turns far from the ABS (not shown in FIGS. 3A-3B).

The auxiliary pole(s) 123 and 124 may optionally be provided, via step 204. Portions of step 204 may thus be interleaved with other steps. For example, the auxiliary pole 123 may be provided before the main pole 130'. However, the auxiliary pole 124 may be provided after the main pole 130'. In other embodiments, some or all of step 204 may be omitted. For example, the auxiliary pole 123 may be omitted, the auxiliary pole 124 may be omitted or both auxiliary poles 123 and 124 may be omitted.

The main pole 130' is provided, via step 206. Step 206 may include using a damascene process. For example, a trench may be formed in a layer and the material(s) for the pole 130' deposited and patterned. In some embodiments, the trench formed is deep enough to accommodate both portions 132' and 134'. One or more ferromagnetic materials are deposited. Part of the material(s) at the top of the pole 130' may be removed, for example via ion milling. Thus, the first portion 132' and the second portion 134' may be formed. In other embodiments, different material(s) may be used for the first and second portions of the main pole 130'. In such embodiments, the material(s) for the first portion 132' may be deposited, then the material(s) for the second portion 134' deposited. In such embodiments, the first portion 132' may be masked before deposition of the second portion. In other embodiments, the second portion 134' may be masked and milled after deposition. Other methods may also be used to form the pole 130' including but not limited to full film deposition of magnetic materials and removal for example via milling and/or lapping. The shield(s) 125 may also optionally be provided, via step 208.

Using the method 200, the magnetic disk drives 100, 100', 100", 100'" and/or 100"" may be provided. Thus, the benefits of the magnetic disk drive(s) 100, 100', 100", 100'", and/or 100"" may be achieved.

We claim:

1. A magnetic transducer having air-bearing surface (ABS) comprising:
   a main pole having a first portion and a second portion, the first portion including a pole tip and at least one side surface, the pole tip having an ABS facing surface at the ABS, the first portion having a first flare angle between the ABS and a side surface, the second portion residing on the first portion, being recessed from the ABS and having a second flare angle greater than the first flare angle, the first portion having a first maximum width in a cross track direction, the second portion having a second maximum width in the cross track direction, the first maximum width being greater than the second maximum width; and
   at least one coil for energizing the main pole.

2. The magnetic transducer of claim 1 wherein the second flare angle is at least seventy degrees.

3. The magnetic transducer of claim 2 wherein the second flare angle is at least seventy-four degrees.

4. The magnetic transducer of claim 1 wherein the second maximum width is greater than or equal to one half of the first width.

5. The magnetic transducer of claim 4 wherein the second portion is recessed a distance from the ABS, the first portion having a first width in a cross track direction, the second portion having a second width in the cross track direction, the first width being substantially the same as the second width at the distance.

6. The magnetic transducer of claim 4 wherein the pole tip has a first trailing edge bevel extending a bevel distance from the ABS, wherein the second portion has a second trailing edge bevel and wherein the second portion is recessed greater than the bevel distance from the ABS.

7. The magnetic transducer of claim 4 wherein the pole tip has a first trailing edge bevel having a first bevel angle, wherein the second portion has a second trailing edge bevel having a second bevel angle different from the first bevel angle.

8. The magnetic transducer of claim 1 further comprising:
an additional pole adjoining the main pole, the additional pole being recessed from the ABS, the second portion of the main pole being between the additional pole and the ABS.

9. The magnetic transducer of claim 1 wherein the second portion is recessed at least one hundred nanometers and not more than three hundred nanometers.

10. The magnetic transducer of claim 1 wherein the second portion has a thickness of at least fifty and not more than one hundred nanometers.

11. A magnetic transducer having air-bearing surface (ABS) comprising:
a main pole having a first portion and a second portion, the first portion including a pole tip and at least one side surface, the pole tip having an ABS facing surface at the ABS, the first portion having a first flare angle between the ABS and a side surface, the second portion residing on the first portion, being recessed from the ABS and having a second flare angle greater than the first flare angle, the first portion being wider in a cross track direction than the second portion; and
at least one coil for energizing the main pole;
wherein the pole tip has a first trailing edge bevel and wherein the second portion has a second trailing edge bevel, the first and second trailing edge bevels forming a single write pole bevel.

12. A magnetic transducer having air-bearing surface (ABS) comprising:
a main pole having a first portion and a second portion, the first portion including a pole tip and at least one side surface, the pole tip having an ABS facing surface at the ABS, the first portion having a first flare angle between the ABS and a side surface and having a first width, the second portion residing on the first portion, being recessed from the ABS a distance, having a second width, and having a second flare angle of at least seventy-four degrees, the first width being substantially the same as the second width at the distance, the first portion being wider in a cross track direction than the second portion further from the ABS than the distance, the pole tip having a first trailing edge bevel, the second portion having a second trailing edge bevel, the first and second trailing edge bevels forming a single write pole bevel, the distance being at least one hundred nanometers and not more than three hundred nanometers, the second portion having a thickness of at least fifty nanometers and not more than one hundred nanometers;
an additional pole recessed from the ABS, the second portion being between the ABS and the additional pole; and
at least one coil for energizing the main pole.

13. A disk drive comprising:
a media,
a slider, and
a magnetic transducer coupled with the slider, the magnetic transducer having air-bearing surface (ABS), a main pole, and at least one coil for energizing the main pole, the main pole having a first portion and a second portion, the first portion including a pole tip and at least one side surface, the pole tip having an ABS facing surface at the ABS, the first portion having a first flare angle between the ABS and a side surface, the second portion residing on the first portion, being recessed from the ABS and having a second flare angle greater than the first flare angle, the first portion having a first maximum width in a cross track direction, the second portion having a second maximum width in the cross track direction, the first maximum width being greater than the second maximum width.

14. A method for providing a magnetic transducer having air-bearing surface (ABS) comprising:
providing a main pole having a first portion and a second portion, the first portion including a pole tip and at least one side surface, the pole tip having an ABS facing surface at the ABS, the first portion having a first flare angle between the ABS and a side surface, the second portion residing on the first portion, being recessed from the ABS and having a second flare angle greater than the first flare angle, the first portion having a first maximum width in a cross track direction, the second portion having a second maximum width in the cross track direction, the first maximum width being greater than the second maximum width; and
providing at least one coil for energizing the main pole.

15. The method of claim 14 wherein the second flare angle is at least seventy degrees.

16. The method of claim 15 wherein the second flare angle is at least seventy-four degrees.

17. The method of claim 14 wherein the second maximum width is greater than or equal to one half of the first maximum width and less than the first maximum width.

18. The method of claim 17 wherein the second portion is recessed a distance from the ABS, the first portion having a first width in a cross track direction, the second portion having a second width in a cross track direction, the first width being substantially the same as the second width at the distance.

19. The method of claim 14 further comprising:
providing an additional pole adjoining the main pole, the additional pole being recessed from the ABS, the second portion of the main pole being between the additional pole and the ABS.

20. The method of claim 14 wherein the second portion is recessed at least one hundred nanometers and not more than three hundred nanometers.

21. The method of claim 14 wherein the second portion has a thickness of at least fifty and not more than one hundred nanometers.

22. A method for providing a magnetic transducer having air-bearing surface (ABS) comprising:
providing a main pole having a first portion and a second portion, the first portion including a pole tip and at least one side surface, the pole tip having an ABS facing surface at the ABS, the first portion having a first flare angle between the ABS and a side surface, the second portion residing on the first portion, being recessed from the ABS and having a second flare angle greater than the first flare angle, the first portion being wider in a cross track direction than the second portion; and providing at least one coil for energizing the main pole;

wherein the pole tip has a first trailing edge bevel and wherein the second portion has a second trailing edge bevel, the first and second trailing edge bevels forming a single write pole bevel.

\* \* \* \* \*